(12) United States Patent
Haeusser et al.

(10) Patent No.: US 11,203,330 B2
(45) Date of Patent: Dec. 21, 2021

(54) HYDRAULIC UNIT (71) Applicant: Robert Bosch GmbH, Stuttgart (DE)

(72) Inventors: Bernd Haeusser, Neckarwestheim (DE); Oliver Gaertner, Abstatt (DE); Wolfgang Mailaender, Hemmingen (DE); Rolf Stotz, Vaihingen (DE); Oliver Hennig, Obersulm (DE); Michael Schuessler, Seckach (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 15/768,173

(22) PCT Filed: Oct. 13, 2015

(86) PCT No.: PCT/EP2015/073682
§ 371 (c)(1),
(2) Date: Apr. 13, 2018

(87) PCT Pub. No.: WO2017/063678
PCT Pub. Date: Apr. 20, 2017

(65) Prior Publication Data
US 2018/0304873 A1    Oct. 25, 2018

(51) Int. Cl.
*B60T 13/16*    (2006.01)
*B60T 8/40*    (2006.01)
(Continued)

(52) U.S. Cl.
CPC .............. *B60T 13/16* (2013.01); *B60T 8/368* (2013.01); *B60T 8/4031* (2013.01);
(Continued)

(58) Field of Classification Search
CPC ...... B60T 13/16; B60T 13/161; B60T 8/4068; B60T 8/368; B60T 8/4031;
(Continued)

(56) References Cited

U.S. PATENT DOCUMENTS

| | | | | |
|---|---|---|---|---|
| 3,707,339 A | * | 12/1972 | Budgen | F04C 28/28 418/13 |
| 6,390,133 B1 | * | 5/2002 | Patterson | B60T 8/3615 138/30 |
| 6,398,315 B1 | * | 6/2002 | Dinkel | B60T 8/368 303/113.1 |
| 6,869,152 B2 | * | 3/2005 | Weh | B60T 8/368 303/116.4 |

(Continued)

FOREIGN PATENT DOCUMENTS

DE    103 02 681 B3    8/2004
DE    10 2008 002 740 A1    12/2009
(Continued)

OTHER PUBLICATIONS

International Search Report corresponding to PCT Application No. PCT/EP2015/073682, dated Apr. 25, 2016 (German and English language document) (7 pages).

*Primary Examiner* — Melody M Burch
(74) *Attorney, Agent, or Firm* — Maginot, Moore & Beck LLP (57) ABSTRACT

A hydraulic unit, in particular a hydraulic unit for a slip-controllable vehicle brake system, includes a housing block, a pump, and a damping device. The pump has an intake side and a delivery side. The housing block has a pump receptacle that holds the pump, a first fluid duct that intersects the pump receptacle in a region of the delivery side of the pump, and a second fluid duct opening into the pump receptacle in the region of the delivery side of the pump, and a first separation point that seals off the first fluid duct from the second fluid duct. The damping device damps pulsations and reduces operating noise of the hydraulic unit without (i) having a detrimental effect on functional characteristics of the unit, in particular on pressure build-up dynamics of the vehicle brake system, or without (ii) jeopardizing a compact construction of the hydraulic unit.

20 Claims, 7 Drawing Sheets

(51) Int. Cl.
*F04B 53/16* (2006.01)
*B60T 8/36* (2006.01)
*F04B 1/0421* (2020.01)
*F04B 1/0404* (2020.01)
*F15B 21/00* (2006.01)

(52) U.S. Cl.
CPC .......... *B60T 8/4068* (2013.01); *F04B 1/0404* (2013.01); *F04B 1/0421* (2013.01); *F04B 53/16* (2013.01); *F15B 21/008* (2013.01); *B60T 13/161* (2013.01); *B60T 2270/203* (2013.01)

(58) Field of Classification Search
CPC .. B60T 2270/203; F04B 53/16; F04B 1/0421; F04B 1/0404; F15B 21/008
See application file for complete search history.

(56) References Cited

U.S. PATENT DOCUMENTS

| | | | | |
|---|---|---|---|---|
| 7,118,183 | B2* | 10/2006 | Hinz | ........................ B60T 8/368 |
| | | | | 303/119.3 |
| 10,730,496 | B2* | 8/2020 | Schumann | ............ B60T 8/4068 |
| 2004/0160120 | A1 | 8/2004 | Weh et al. | |

FOREIGN PATENT DOCUMENTS

| | | |
|---|---|---|
| DE | 10 2011 089 994 A1 | 6/2013 |
| EP | 0 761 967 A1 | 3/1997 |
| JP | H 02-225802 A | 9/1990 |
| JP | 9-53571 A | 2/1997 |
| WO | 96/28661 A1 | 9/1996 |
| WO | 2015/154901 A1 | 10/2015 |
| WO | 2015/154904 A1 | 10/2015 |

* cited by examiner

HYDRAULIC UNIT

This application is a 35 U.S.C. § 371 National Stage Application of PCT/EP2015/073682, filed on Oct. 13, 2015, the disclosure of which is incorporated herein by reference in its entirety.

BACKGROUND

The disclosure relates to a hydraulic unit, in particular for a slip-controllable vehicle brake system.

A hydraulic unit of this kind is known from DE 10 2008 002 740 A1, for example. This known hydraulic unit has a housing block on which the individual components for controlling the brake pressure as a function of the existing wheel slip are arranged and in hydraulic contact with one another. An essential component in this respect is a pump which is inserted in a pump receiving means of the housing block and, for example, is actuated mechanically by an electric motor and an eccentric driven thereby. Pumps convey pressurizing medium away from the wheel brakes as required, in order to lower the wheel brake pressure or supply the wheel brakes with pressurizing medium at high pressure, in case an increase in the wheel brake pressure is required.

In particular, pumps in the form of piston pumps may trigger pressure pulsations due to their cyclical working principle, which pressure pulsations are noticeable in the vehicle as unwanted operating noises. In order to smooth or damp these pulsations, damping devices are provided on the pump delivery side which usually have at least one pressurizing medium reservoir with a storage capacity (C-member) that can be varied in a pressure-dependent manner and at least one throttle element arranged downstream thereof (R-member). Pressurizing medium reservoirs in the form of spring-operated piston accumulators are known in the art, for example, which are arranged in their own storage receiving means in the hydraulic unit and are in contact with the pump delivery side via pressurizing medium-conducting fluid ducts. Fixed throttles with a constant throttle cross section or dynamic throttles with a throttle cross section that can be varied in a pressure-dependent manner are known in the art.

Irrespective of this, due to the small amount of assembly space available in motor vehicles, it is necessary for the hydraulic unit, and therefore the housing block thereof, to be as compact and weight-saving as possible. A known measure for this is that of arranging the fluid duct on the hydraulic unit for there to be contact between a changeover valve and an inlet valve in a vehicle brake system in such a manner that said hydraulic unit crosses a pump receiving means.

Attaching a damping device for damping pressure pulsations to a fluid duct running in this manner has the disadvantage that the throttle element downstream of the pressurizing medium reservoir represents a flow resistance which has a negative impact in operating states of the vehicle brake system in which the important thing is the rapid supply of the greatest possible volume of pressurizing medium. These are emergency braking actions, for example, particularly intended to avoid a collision with other road users. Particularly when temperatures are dropping and pressurizing media are becoming increasingly viscous as a result, the throttle effect of the throttle element also rises sharply and thereby exacerbates the effect that has been described.

SUMMARY

By contrast, the advantage of a hydraulic unit according to this disclosure is that the pressure pulsations of a pump can be effectively reduced without the measures used for this purpose having a negative effect on the size of the building block or on the functional properties, in particular the pressure build-up dynamics, of the vehicle brake system.

According to the disclosure, a second fluid duct, among other things, is provided which opens out in the region of the pump delivery side. In addition, there is a separation point for sealing off the two fluid ducts in respect of one another. The first fluid duct crossing the pump receiving means circulates around the pump inserted in the pump receiving means and also the pressure pulsation damper inserted in a damper receiving means, while the second fluid duct makes contact between the pump delivery side and the pressure pulsation damper. Downstream of the pressurizing medium reservoir, the two fluid ducts are brought together.

The seal of the two fluid ducts with respect to one another can be achieved through the modification of assembly components which are present in any event and an adapted configuration of the building block, so that the total number of components or else the parts and assembly expenditure of the hydraulic unit is only marginally increased by the disclosure.

The pressure pulsation damper can be optimized in respect of its actual function of damping pressure pulsations and thereby improving the operating noise of the vehicle brake system without the functional properties thereof, in particular the pressure build-up dynamics, being adversely affected.

Further advantages or advantageous developments of the disclosure resulted from the claims and/or from the following description.

The sealing of the fluid ducts in respect of one another can be achieved particularly easily and cost-effectively when a closing element interacting with the housing block is used as the unit component for creating the separation point, which closing element is in any case provided to seal off the pump bore with respect to the environment. Alternatively, instead of the closing element, a cylinder element of the pump may be used which is provided to guide a piston.

The separation point may be configured in a variety of ways through form fitting and/or force fitting between the housing block and the unit component and may therefore be adapted in an application-specific manner. Apart from a reliable and permanent sealing action, a fixed anchoring of the respective unit component on the housing block is produced simultaneously with a single working operation.

The use of cutting edges on one or a plurality of components to be fastened to one another allows the fixing to be constituted by an easily controlled and easily monitored pressing action, without the use of additional material or a tool. In view of the relatively small dimensions of the pump element, this is advantageous because it means that an assembly realizable in an at least partially automated manner is possible. The fluid ducts can be constituted in a particularly space-saving and a particularly simple manner in production terms when they are oriented on the housing block essentially at right angles to a longitudinal axis of the pump receiving means and/or when they run in an at least sectionally axis-parallel manner to one another.

BRIEF DESCRIPTION OF THE DRAWINGS

Exemplary embodiments of the disclosure are depicted in the figures and explained in detail in the following description.

A second exemplary embodiment of a correspondingly developed first separation point is disclosed in FIG. 7.

DETAILED DESCRIPTION

Figure 1:
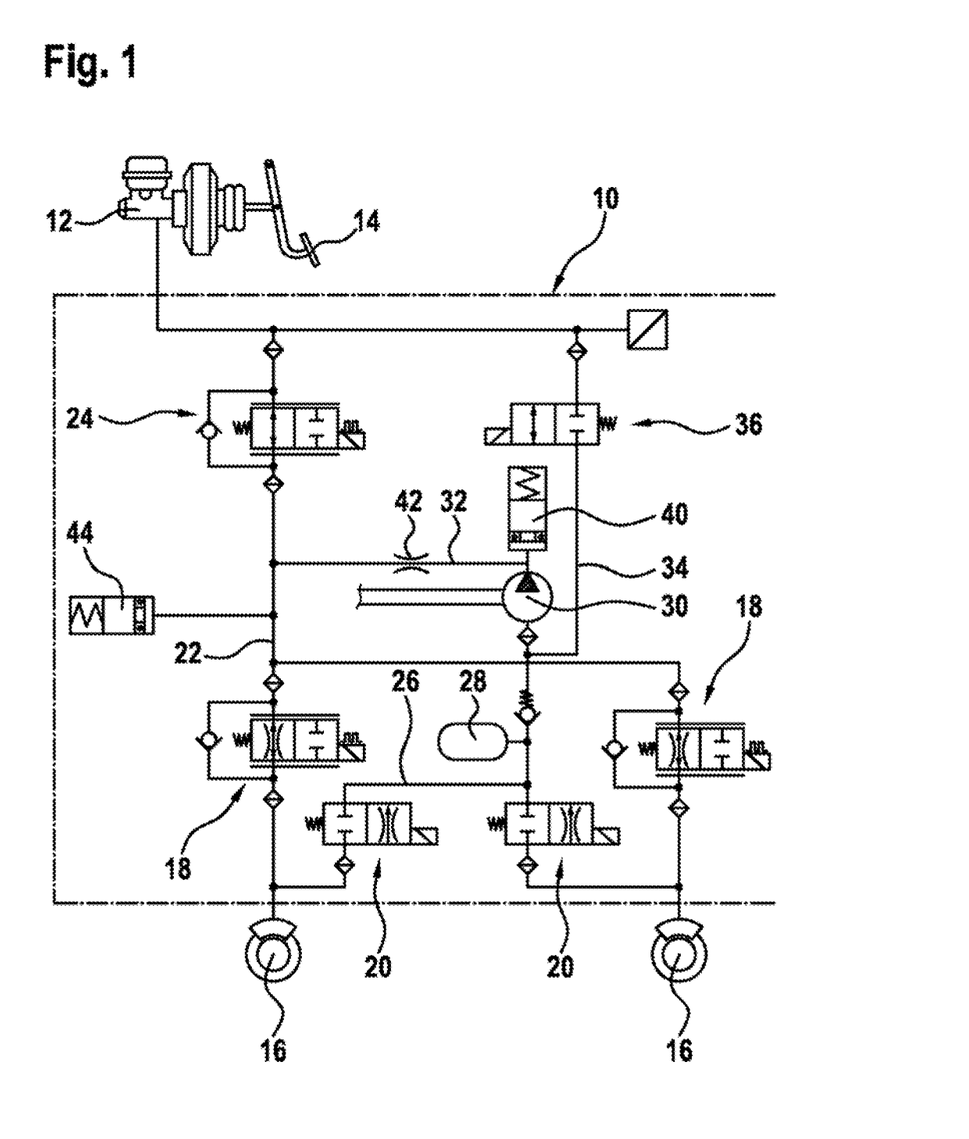
FIG. 1 shows a brake circuit of a slip-controllable vehicle brake system to provide understanding of the technical background, said vehicle brake system being fitted with the components essential to the disclosure.

FIG. 1 shows with the help of a hydraulic circuit diagram the hydraulic components of a brake circuit of a vehicle brake system. These hydraulic components are indirectly attached in part to a hydraulic unit 10 or are arranged in part directly on this hydraulic unit 10. The hydraulic unit 10 as such is symbolically depicted as a dot-dash border line in FIG. 1. A main brake cylinder 12 which can be operated by the driver via a brake pedal 14 is attached to the hydraulic unit 10. In addition, two wheel brakes 16 which are supplied with pressurizing medium from the hydraulic unit 10 are attached by way of example to the hydraulic unit 10. To control the brake pressure as a function of the current slip conditions on the wheels of a vehicle assigned to the wheel brakes 16, each wheel brake 16 is assigned a so-called pressure build-up or inlet valve 18 and a so-called pressure lowering or outlet valve 20. The inlet valves 18 are located in a pressurizing medium connection 22 which connects the attachment of the main brake cylinder 12 on the hydraulic unit 10 to an attachment of one of the wheel brakes 16 shown. In order to control this pressurizing medium connection 22, a so-called changeover valve 24 is present. If said changeover valve interrupts the pressurizing medium connection 22 by electronic actuation, the main brake cylinder 12 is uncoupled from the wheel brakes 16 and the driver cannot alter the brake pressure on the wheel brakes 16 by brute force.

The outlet valves 20 can be opened through electronic actuation, in order to divert pressurizing medium away from the wheel brakes 16 where necessary, if a reduction in brake pressure is needed. The outflowing pressurizing medium reaches a return flow 26 configured on the hydraulic unit 10 with a buffer reservoir 28 attached thereto which initially receives the outflowing pressurizing medium. An externally drivable pump 30 is attached to the buffer reservoir 28 downstream, which pump conveys the pressurizing medium away from the buffer reservoir 28 and feeds it via a pump pressure line 32 connected to the pump outlet back into the pressurizing medium connection 22 of the main brake cylinder 12 to the wheel brakes 16. The pump pressure line 32 opens out for this purpose in the portion between the changeover valve 24 and the inlet valve 18 into this pressurizing medium connection 22.

If the buffer store 28 alone should not be sufficient to supply the pump 30 with pressurizing medium, a suction line 34 is configured on the hydraulic unit 22 which connects the intake side or else the pump intake of the pump 30 to the attachment of the main brake cylinder 12 on the hydraulic unit 10. This suction line 34 is controlled by demand-based electronic actuation of a so-called high-pressure switch valve 36.

This component configuration, or else the interaction thereof for controlling the brake pressure of the wheel brakes 16, is to this extent included in the state of the art.

Piston pumps are frequently used as pumps 30 in slip-controllable vehicle brake systems, the pistons whereof are driven by an eccentric in a back and forth movement. This cyclical operation may result in pressure pulsations which can be transmitted into the vehicle where they can be perceived as operating noises or vibrations.

In order to dampen pressure pulsations in a low pressure range of up to approx. 40 bar, the pump delivery side interacts with a low-pressure damper 40 which has a low-pressure throttle 42 inserted downstream. Low-pressure dampers 40 and the low-pressure throttles 42 together create a low-pressure damping device which, along with the pump 30, can form a single subassembly that can be arranged in a pump receiving means 50 of the hydraulic unit 10.

In addition, downstream of the low-pressure throttle 42 for damping pressure pulsations in the high pressure range, in other words above approx. 40 bar, a high-pressure damper 44 is provided. A high-pressure throttle is integrated in the high-pressure damper 44 such that it is unrecognizable. The two components together form a high-pressure damping device. This is attached to the pressurizing medium connection 22 leading from the attachment of the main brake cylinder 12 to the attachment of the wheel brakes 16 in the region between the changeover valve 24 and the inlet valves 18.

The disclosure involves the components that have been explained for damping the pressure pulsations being arranged as economically as possible in spatial terms on the hydraulic unit 10 and, in particular, making contact hydraulically in accordance with the circuit diagram depicted in FIG. 1, without the functional properties, in particular the pressure build-up dynamics of the vehicle brake system, deteriorating as a result. A first exemplary embodiment for this purpose is depicted in FIG. 2.

Figure 2:
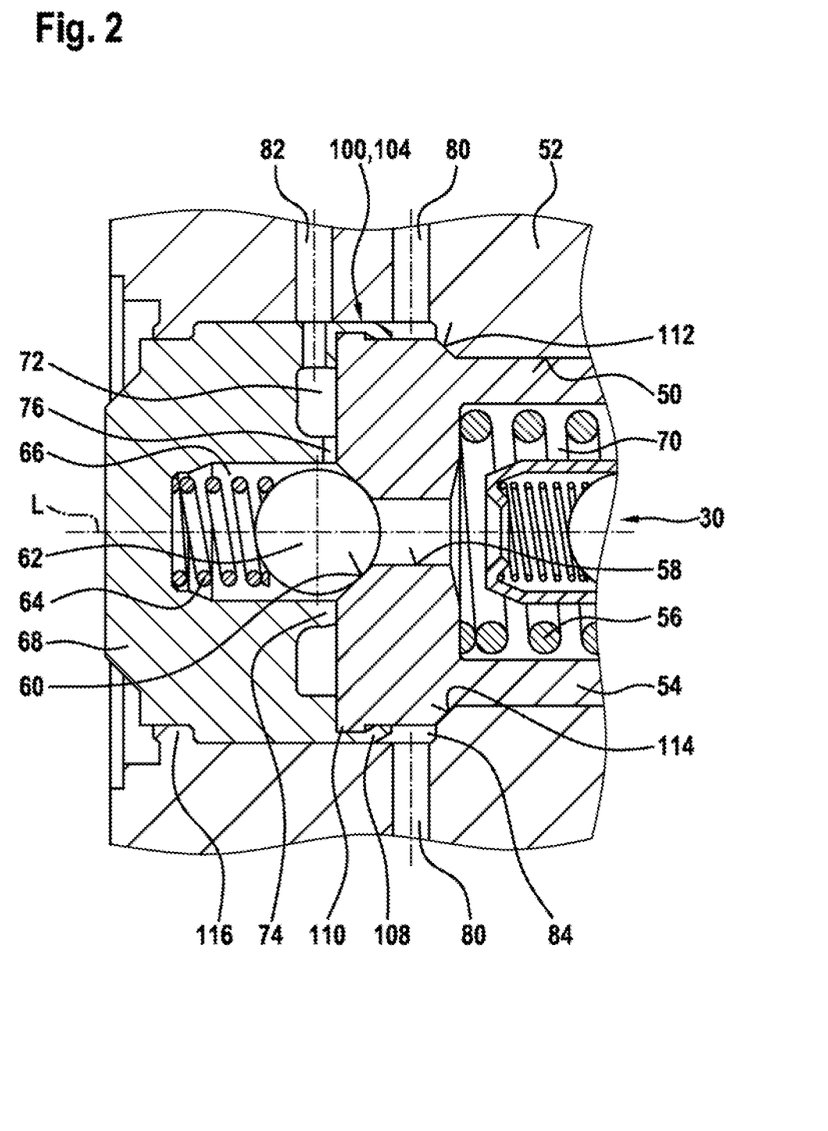
FIG. 2 shows a first exemplary embodiment of the disclosure in schematically simplified form with the help of a longitudinal section through a hydraulic unit in the region of the pump delivery side.

FIG. 2 shows as a detail the outlet-side or delivery-side end of a pump 30 configured as a piston pump. This is installed in a pump receiving means 50 of the housing block 10. The pump receiving means 50 is outwardly open and is closed off by a plug 68. A cylinder element 54 of the pump 30 receives a piston that cannot be seen in FIG. 2 in an axially movable manner and is used for the guidance thereof. The piston is actuated against the force of a return spring 56 which is supported on the floor of the cylinder element 54. In the center of the floor of the cylinder element 54 is located a through hole 58 which ends in a conically formed valve seat 60. This valve seat 60 is controlled by a closing member 62, configured in this case by way of example as a cone, which closing member is pressed by a valve spring 64 against the valve seat 60 for this purpose. The valve spring 64 is supported on the base of a recess 66 configured as a blind hole in the plug 68. Said plug is anchored in a force-fitting manner with the help of a clinch connection in the pump receiving means 50.

In the state shown, the closing member 62 bears against the valve seat 60 and thereby prevents pressurizing medium from escaping from the inside of the cylinder element 54 into the outlet or delivery region of the pump 30. With a downward movement of the piston in FIG. 2, a pump space 70 enclosed by the piston and the cylinder element 54 is made smaller and the pressure inside the pump space 70 increases. If the hydraulic compressive force on the closing member 62 is greater than the opposing spring force, the closing member 62 lifts off the valve seat 60 and the pressurizing medium flows through the through hole 58 to an annular groove 72 which is formed on an end face of the plug 68 facing the cylinder element 54. The annular groove 72 encloses the valve seat 60 at a radial distance, as a result of which a circumferential web 74 is formed between the annular groove 72 and the valve seat 60. At least one radially running recess is provided which crosses the web 74 and may be configured in this case as a throttle cross-section 76. Pressurizing medium flows through the throttle cross section 76 to a fluid duct 82 configured in the housing block 52 which is referred to below as the second fluid duct 82 to avoid confusion. The latter is arranged substantially at right angles to a longitudinal axis L of the pump receiving means 50 and opens out into a damper receiving means 90 (FIG. 3) that cannot be identified on the housing block 52 of the hydraulic assembly 10. The damper receiving means 90 receives the high-pressure damper element 44.

In addition, a so-called first fluid duct 80 is provided on the housing block 52 according to the disclosure, which fluid duct is oriented at least sectionally axis-parallel to the second fluid duct 82 and crosses the pump receiving means 50. This first fluid duct 80 according to FIG. 1 connects the changeover valve 24 of the vehicle brake system to the inlet valve 18 and therefore creates the pressurizing medium connection 22. The first fluid duct 80 likewise runs at right angles to the longitudinal axis L of the pump receiving means 50, but unlike the second fluid duct 82 is free of throttle points and therefore allows an unhindered flow of pressurizing medium from the changeover valve 24 to the inlet valve 18. For this purpose, the pump receiving means 50 forms along with the pump 30 inserted therein an annular duct 84 enclosing the built-in cylinder element 54 of the pump 30, into which the first fluid duct 80 on a circumferential side of the pump receiving means 50 opens and leaves again on the opposite circumferential side.

The two fluid ducts 80 and 82 are sealed in respect of one another according to the disclosure. This takes place by means of a first separation point 100 which is formed by a housing portion 104 of the pump receiving means 50 laid between the two fluid ducts 80 and 82 operatively connected to a unit component inserted in the pump receiving means 50. In the exemplary embodiment shown, this unit component is a plug 68 which closes the pump receiving means 50 in respect of the environment.

Figure 4:
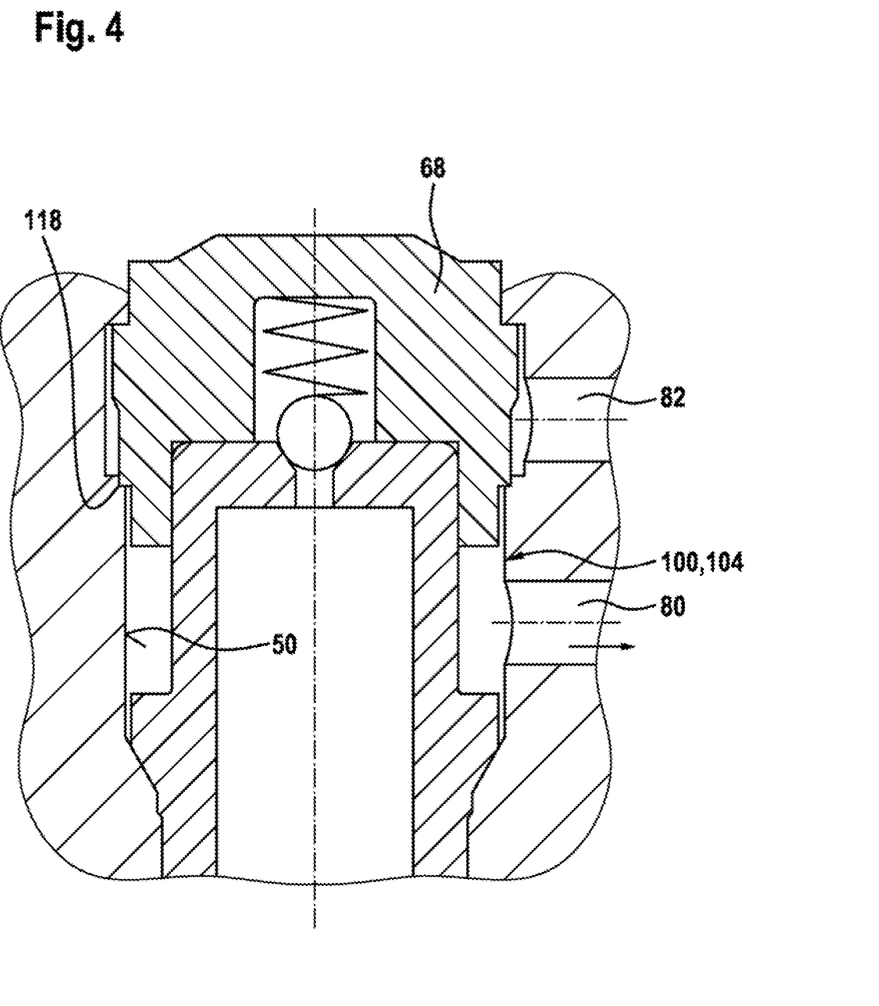
In FIGS. 4 and 5 second or third exemplary embodiments of the disclosure are likewise depicted in longitudinal section.

Alternatively, the cylinder element 54 of the pump 30 could also be used as the unit component which, however, is only disclosed in detail below in connection with the description of FIG. 4.

The plug 68 and the cylinder element 54 of the pump 30 are advantageously mechanically connected to one another. In order to form this connection, the plug 68 is provided with a flange 108, into which the cylinder element 54 is introduced until the two components abut one another with their respective end faces. The cylinder element 54 in this region is provided with a circumferential, radially projecting collar 110 which projects beyond the flange 108 axially in the direction of the longitudinal axis L. Following the mutual placement of the cylinder element 54 and plug 68, the flange 108 is plastically deformed, as a result of which it engages behind the collar 110 of the cylinder element 54 and therefore connects the two components to one another in a form-fitting manner into a subassembly.

This subassembly made up of a plug 68 and cylinder element 54 is inserted into the pump receiving means 50 until a chamfer 112 formed on the cylinder element 54 comes to bear against a matching chamfer 114 in the pump receiving means 50 and thereby seals the pump delivery side in respect of the pump intake side. The plug 68 is oversized with respect to the diameter of the pump receiving means 50, so that there is a force-fitting connection between the plug 68 and the pump receiving means 50, in other words a press-fitting connection can be made. The latter extends to the housing portion 104 lying between the two fluid ducts 80 and 82 and thereby creates the first separation point 100.

Figure 3:
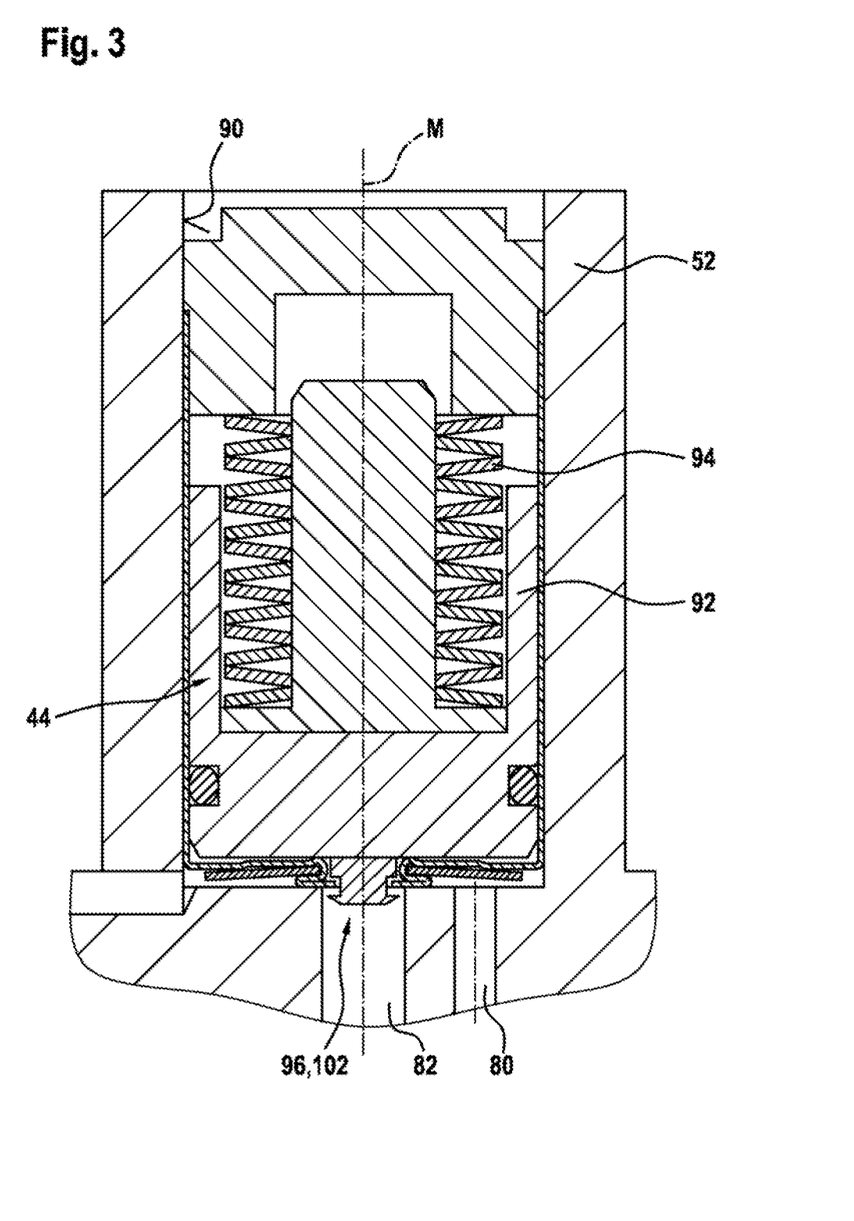
FIG. 3 discloses a longitudinal section through a damper unit installed in the hydraulic unit.

According to FIG. 3, the second fluid duct 82 opens out at its end facing away from the pump receiving means 50 into a damper receiving means 90 for the high-pressure damper element 44 configured on the housing block 52. The opening point of the second fluid duct 82 lies eccentrically to a center axis M of the damper receiving means 90 in a region which allows an unimpeded flow through a supply valve 96 of the high-pressure damper element 44 fitted in the damper receiving means 90. The latter is fitted by way of example with a damper piston 92 which, acted upon by a damper spring 94, adopts a basic position depicted in FIG. 4. In this basis position, the supply valve 96 of the damper device is opened by the damper piston 92 and thereby produces a pressurizing medium connection to the second fluid duct 82 which likewise opens into the damper receiving means 90. Pressure pulsations occurring in the second fluid duct 82 can be damped by the movability of the damper piston 92 against the force of the damper spring 94.

The supply valve 96 is not visibly fitted with a high-pressure throttle through which the pressurizing medium received in the high-pressure damper 44 flows away. Downstream of this high-pressure throttle, the first fluid duct 80 and the second fluid duct 82 flow into one another. The supply valve 96 therefore acts as a second separation point 102 for the mutual sealing of the two fluid ducts 80 and 82.

A particularly effective force-fitting connection of the unit component or else of the plug 68, according to exemplary embodiment 1, to the pump receiving means 50 can be achieved by shrink-wrapping the plug 68. For this purpose, before the press-fitting process, the plug is cooled down to a temperature which is substantially lower than the temperature of the building lock 52 in the region of the pump receiving means 50. With its subsequent warming, the radial tension forces effective on the plug 68 rise to a magnitude which, without cooling, would have necessitated substantially higher axial pressing forces and would therefore have increased the risk of unwanted chip formation.

FIG. 2 shows, moreover, that where needed in addition to the clinch connection a securing of the plug 68 and, indirectly therefore, of the pump 30 in the pump receiving means 50 can be performed by caulking 116. For this purpose, by means of a stamp the housing block 52 in the circumferential region of the pump receiving means 50 is plastically deformed in such a manner that this material of the housing block 52 covers a shoulder 116 provided in the circumferential direction of the plug 68 at least in segments or sections.

Instead of the purely force-fitting connection between the unit component and the pump receiving means 50, as described, to constitute the first separation point 100, a combination of a force-fitting and a form-fitting connection may also be provided as an alternative. A second exemplary embodiment of this kind is depicted in FIG. 4.

In this exemplary embodiment, the unit component or else the plug 68 is provided with cutting edges 118 on its outer periphery which extend axially or in the direction of the longitudinal axis L of the pump receiving means 50. The inner diameter of the pump receiving means 50 is returned in sections at a step until when the plug 68 is joined, the cutting edges 118 cut into the wall of the returned portion of the pump receiving means 50. A number or a grouping of cutting edges 118 distributed over the circumference of the plug 68 is freely selectable according to the specific application. The cutting edges 118 secure the plug 68 in the pump receiving means 50 to prevent twisting and thereby create a form fit while, furthermore, during the cutting into the returned portion of the wall of the pump receiving means 50 in the inner diameter, they push away material to the side and thereby increase the clamping forces acting on the plug 68 with respect to the clamping forces that can be achieved by the pure force fitting.

Another variant representing the combination of a force-fitting and a form-fitting first separation point 100 is through the use of a self-clinch connection between the pump receiving means 50 and the unit component. This variant is shown in FIG. 5.

In this example, the cylinder element 54 of the pump 30 is used as the unit component. This consideration may also apply in principle to the previously described embodiment variants.

Figure 5:
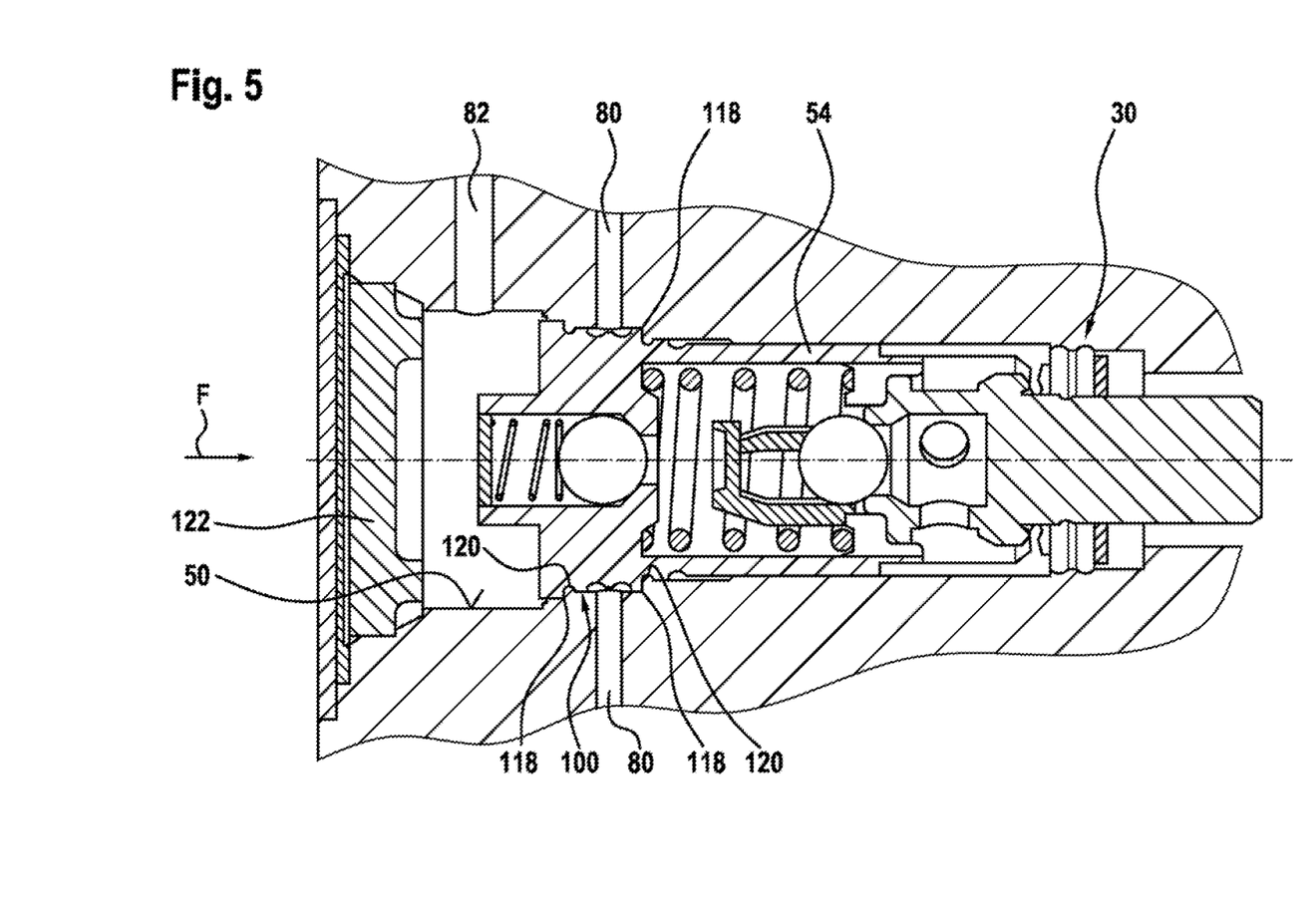

According to FIG. 5, the cylinder element 54 is provided with annular circumferential cutting edges 118 on its outer periphery. By way of example, two cutting edges 118 are configured which come to rest on both sides of the opening cross section of the first fluid duct 80 in the pump receiving means 50, when the cylinder element 54 of the pump 30 is located in its final press-fitting position as provided for. A plurality of cutting edges 118 on both sides of the opening cross section of the first fluid duct 80 would of course be conceivable. In the joining direction of the cylinder element 54 above the cutting edges 118 in each case, peripheral grooves 120 are formed along the circumference of the cylinder element 54. When joining the cylinder element 54 with the pump receiving means 50, the annular cutting edges 118 force material of the wall of the pump receiving means 50 into these grooves 120 and thereby create the form fit between the components.

In order to close the opening of the pump receiving means 50, in this exemplary embodiment a relatively flat cover 122 is used which can likewise be anchored in a force-fitting and/or form-fitting manner in the pump receiving means 50.

Figure 6:
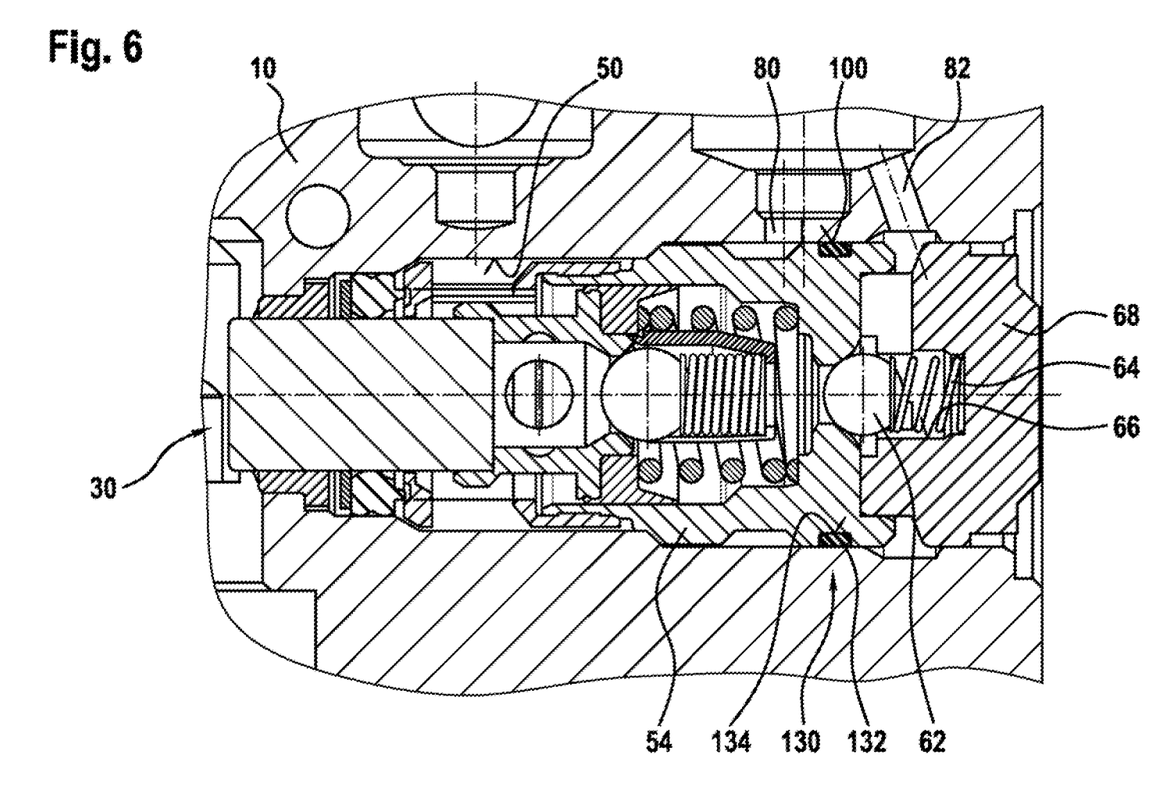
FIG. 6 shows the housing block with a pump installed in a pump receiving means in longitudinal section, wherein a first separation point between the fluid ducts crossing the pump receiving means on the pump delivery side is developed with respect to its sealing action.

FIG. 6 shows an exemplary embodiment with a pump 30 which is inserted into a pump receiving means 50 of a housing block 10. In accordance with the previously described examples, two fluid ducts 80, 82 are formed in the housing block 10 in this case too, said fluid ducts crossing the pump receiving means 50 in the region of the pump delivery side, wherein between both fluid ducts 80, 82 is located a first separation point 100 at which the fluid ducts 80, 82 are sealed in respect of one another. According to the example in FIG. 4, this first separation point 100 is formed by the cylinder element 54 of the pump 30 and by the wall of the pump receiving means 50 in the housing block 10, wherein the pump receiving means 50 is outwardly closed by a plug 68 which receives a valve spring 64 and a closing member 62 of an outlet valve of the pump 30 in a blind hole-like recess 66.

In order to improve the sealing action of the first separation point 100, an additional sealing device 130 is provided at said separation point. In the exemplary embodiment according to FIG. 6, this sealing device 130 is a sealing ring 132 which has a conventional O-ring design. Likewise, as an alternative, the use of a profile sealing ring or a spring sealing ring or the like would be conceivable. The sealing ring 132 is received in a circumferential groove 134 which is configured for this purpose in the interests of the simplicity of the assembly of the sealing ring 132 on the cylinder element 54 but which could, instead of this, likewise be configured as a clearance groove on the wall of the pump receiving means 50. The sealing ring 132 itself may be produced from a fluid-resistant and permanently elastic elastomer, from a thermosetting plastic or from a metal/plastic composite. O-rings made of elastomer are commercially standard and are correspondingly cost-effective structural elements which, due to their elastic properties, retain their sealing action even in changing temperature and pressure conditions, are easy to fit and, as a result of the use thereof, the force fit between the pump 30 or else the cylinder element 54 and the pump receiving means 50 can be adapted in such a manner that the pump 30 can be dismantled in the event of a possible defect and replaced with a spare part.

Figure 7:
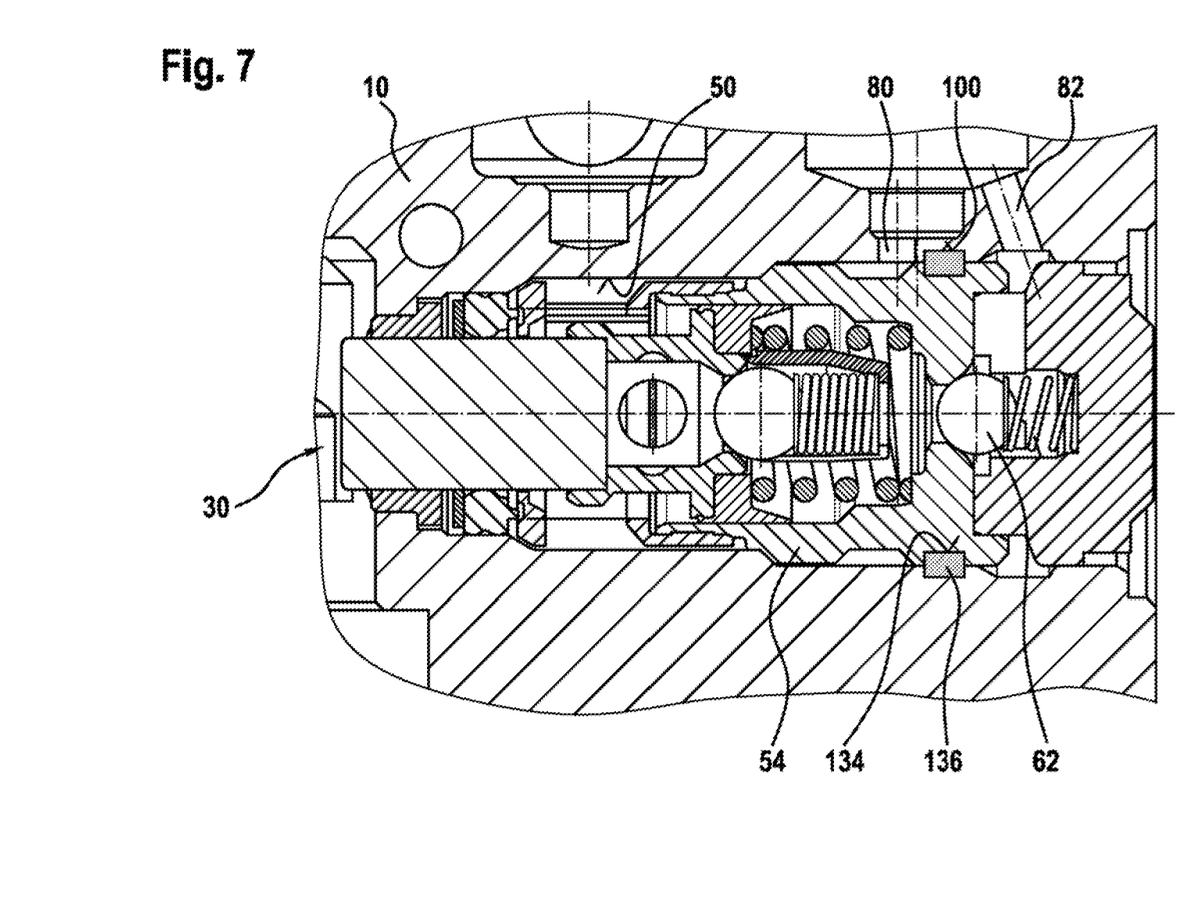

The other exemplary embodiment according to FIG. 7 also shows a pump 30 in a pump receiving means 50 of a housing block 10, fluid ducts 80, 82 crossing this pump receiving means 50 and also a first separation point 100 with improved sealing action between the opening points of these fluid ducts 80, 82 into the pump receiving means 50. However, in this example the additional sealing device 134 provided is not configured as a separate component, as in the example according to FIG. 6, but as a sealing caulk 136, which is arranged in the region of the first separation 100. This sealing caulk 136 is produced by a plastic deformation of material of the cylinder element 54 and/or of the housing block 10 with the help of a tool or stamp provided for this but not depicted in FIG. 7. Corresponding sealing caulking 136 is only depicted schematically in FIG. 7. On the housing block 10 and/or on the cylinder element 54, a recess or groove 134 open on the peripheral side may be provided which is penetrated by the plastically deformed material, so that for the force fit or press-fitting connection between the cylinder element 54 and the pump receiving means 50, an additional force fit is created between these building units which improves the sealing action at the separation point 100.

Further changes or additions to the exemplary embodiments described are of course conceivable without deviating from the basic idea underlying the disclosure.

The invention claimed is:

1. A hydraulic unit, comprising:
    a housing block including:
        a pump receiving portion configured to receive a pump, the pump receiving portion arranged on the housing block and oriented along a longitudinal axis, the pump having a pump intake side and a pump delivery side;
        a first fluid duct opening into the pump receiving portion at a first location in a region of the pump delivery side;
        a second fluid duct opening out into the pump receiving portion at a second location in the region of the pump delivery side;
        a first separation point positioned between the first location whereat the first fluid duct opens into the pump receiving portion and the second location whereat the second fluid duct opens into the pump receiving portion, the first separation point sealing the first fluid duct and the second fluid duct off from each other; and
        a damper receiving portion into which the first and second fluid ducts open; and a damper element arranged in the damper receiving portion and configured to damp pressure pulsations in the second fluid duct, the damper element including a supply valve arranged in one of the first and second fluid ducts, the supply valve configured to selectively allow and disable flow between the first and second fluid ducts through the damper receiving portion.

2. The hydraulic unit as claimed in claim 1, further comprising:
a unit component inserted into the pump receiving portion;
wherein:
the pump receiving portion forms a housing portion located between the first fluid duct and the second fluid duct in the axial direction; and
the housing portion and the unit component seal against one another so as to form the first separation point between the first fluid duct and the second fluid duct.

3. The hydraulic unit as claimed in claim 2, wherein the unit component is (i) a plug that closes the pump receiving portion off with respect to an environment or (ii) a cylinder element configured to guide a piston of the pump.

4. The hydraulic unit as claimed in claim 2, wherein at least the first separation point is formed via at least one of a force fit connection and a form fit connection between the unit component and the pump receiving portion of the housing block.

5. The hydraulic unit as claimed in claim 4, wherein the force fit connection is formed by press-fitting or shrinking the unit component into the pump receiving portion.

6. The hydraulic unit as claimed in claim 4, wherein:
the at least one of the force fit connection and the form fit connection of the unit component is formed in the pump receiving portion by at least one cutting edge on at least one of the unit component and a wall of the pump receiving portion; and
at least one of material of the wall of the pump receiving portion and material of the unit component is plastically deformed due to insertion of the unit component into the pump receiving portion so as to form the at least one of the force fit connection and the form fit connection.

7. The hydraulic unit as claimed in claim 4, wherein:
the at least one of the force fit connection and the form fit connection of the unit component in the pump receiving portion is formed by an interaction between at least one annular circumferential cutting edge and an annular circumferential groove following the at least one annular circumferential cutting edge on at least one of the unit component and the pump receiving portion; and
at least one of material of a wall of the pump receiving portion and material of the unit component is arranged in the annular circumferential groove, said at least one of material of a wall of the pump receiving portion and material of the unit component being pushed into the annular circumferential groove by insertion of the unit component into the pump receiving portion.

8. The hydraulic unit as claimed in claim 1, further comprising at least one additional sealing device positioned at the first separation point.

9. The hydraulic unit as claimed in claim 8, wherein the additional sealing device includes a sealing ring.

10. The hydraulic unit as claimed in claim 9, wherein the sealing ring is an O-ring, a profile ring or a spring sealing ring.

11. The hydraulic unit as claimed in claim 10, wherein the spring sealing ring is formed from an elastomer or a thermosetting or metal/plastic composite material.

12. The hydraulic unit as claimed in claim 8, wherein the additional sealing device is a sealing caulk formed by a portion of plastically deformed material of at least one of the housing block and a cylinder element.

13. The hydraulic unit as claimed in claim 12, wherein the plastically deformed material penetrates a groove formed on at least one of the housing block and the cylinder element in a region of the first separation point.

14. The hydraulic unit as claimed in claim 1, wherein the hydraulic unit is a hydraulic unit of a slip-controllable vehicle brake system.

15. The hydraulic unit as claimed in claim 1, wherein:
the damper element further comprises a damper piston that is movable within the damper receiving portion and a damper spring that acts on the damper piston in a direction toward the first and second fluid ducts,
the supply valve is opened by the damper piston so as to connect the damper receiving portion to the one of the first and second fluid ducts, and
the damper piston is configured to move against a force of the damper spring to damp pressure pulsations in the one of the first and second fluid ducts.

16. A hydraulic unit, comprising:
a housing block including:
a pump receiving portion configured to receive a pump, the pump receiving portion arranged on the housing block and oriented along a longitudinal axis, the pump having a pump intake side and a pump delivery side;
a first fluid duct opening into the pump receiving portion at a first location in a region of the pump delivery side;
a second fluid duct opening out into the pump receiving portion at a second location in the region of the pump delivery side; and
a first separation point positioned between the first location whereat the first fluid duct opens into the pump receiving portion and the second location whereat the second fluid duct opens into the pump receiving portion, the first separation point sealing the first fluid duct and the second fluid duct off from each other;
a cylinder element of the pump arranged in the pump receiving portion; and
a plug inserted into the pump receiving portion so as to close the pump receiving portion from an environment;
wherein:
the pump receiving portion forms a housing portion located between the first fluid duct and the second fluid duct in the axial direction; and
the housing portion and the plug seal against one another so as to form the first separation point between the first fluid duct and the second fluid duct.

17. The hydraulic unit as claimed in claim 16, wherein the housing block further includes a damper receiving portion configured to receive a damper element, the damper receiving portion arranged on the housing block so that the first fluid duct and the second fluid duct flow into the damper receiving portion.

18. The hydraulic unit as claimed in claim 17, wherein the damper element is received in the damper receiving portion of the housing block such that the supply valve, when disabling flow, forms a second separation point with the damper receiving portion, the second separation point sealing the first fluid duct and the second fluid duct off from each other.

19. The hydraulic unit as claimed in claim 18, wherein
the first fluid duct is configured to connect a changeover valve to an inlet valve in a brake circuit of a vehicle brake system;
the first fluid duct is free of throttle points and is configured to conduct pressurizing medium at least in sections about the unit component and about the damper receiving portion; and
the damper receiving portion is fluidly connected to the second fluid duct.

20. A hydraulic unit, comprising:
a housing block including:
 a pump receiving portion configured to receive a pump, the pump receiving portion arranged on the housing block and oriented along a longitudinal axis, the pump having a pump intake side and a pump delivery side;
 a first fluid duct opening into the pump receiving portion at a first location in a region of the pump delivery side;
 a second fluid duct opening out into the pump receiving portion at a second location in the region of the pump delivery side; and
 a first separation point positioned between the first location whereat the first fluid duct opens into the pump receiving portion and the second location whereat the second fluid duct opens into the pump receiving portion, the first separation point sealing the first fluid duct and the second fluid duct off from each other; and
a unit component inserted into the pump receiving portion;
wherein:
 the pump receiving portion forms a housing portion located between the first fluid duct and the second fluid duct in the axial direction;
 the housing portion and the unit component seal against one another via at least one of a force fit connection and a form fit connection so as to form the first separation point; and
 one of the unit component and the housing portion includes an annular circumferential cutting edge and an annular circumferential groove axially adjacent to one another, and material of the other of the unit component and the housing portion fills the annular circumferential groove so as to form the at least one of the force fit connection and the form fit connection.

* * * * *